United States Patent
Kitahara

(10) Patent No.: US 7,929,403 B2
(45) Date of Patent: Apr. 19, 2011

(54) APPARATUS AND METHOD FOR RECORDING INFORMATION IN OPTICAL STORAGE MEDIUM

(75) Inventor: Toshiyuki Kitahara, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 210 days.

(21) Appl. No.: 12/465,316

(22) Filed: May 13, 2009

(65) Prior Publication Data
US 2009/0285081 A1   Nov. 19, 2009

(30) Foreign Application Priority Data
May 13, 2008   (JP) .................. 2008-125904

(51) Int. Cl.
*G11B 7/00*   (2006.01)
(52) U.S. Cl. ....................................... 369/117
(58) Field of Classification Search .................. 369/117
See application file for complete search history.

(56) References Cited

U.S. PATENT DOCUMENTS
7,535,806 B2 *  5/2009  Fumanti ............... 369/44.41

FOREIGN PATENT DOCUMENTS
JP   2005-122807 A   5/2005

* cited by examiner

*Primary Examiner* — Wayne R Young
*Assistant Examiner* — Brenda Bernardi
(74) *Attorney, Agent, or Firm* — Sughrue Mion, PLLC

(57) ABSTRACT

To record information in an optical storage medium, a pulsed laser beam produced by a laser light source is split into first and second pulsed laser beams by a beam splitter. The first pulsed laser beam to be concentrated in the optical storage medium supported by a medium support part is interrupted and resumed by a shutter. The second pulsed laser beam is received by a photosensor which produces a detection signal. A controller includes a sync-generator configured to receive the detection signal from the photosensor and to generate a synchronizing signal based upon the received detection signal, and a shutter driver configured to drive the shutter in synchronization with timing represented by the synchronizing signal generated by the sync-generator.

14 Claims, 4 Drawing Sheets

APPARATUS AND METHOD FOR RECORDING INFORMATION IN OPTICAL STORAGE MEDIUM

CROSS-REFERENCE TO RELATED APPLICATION(S)

This application claims the foreign priority benefit under Title 35, United States Code, §119 (a)-(d), of Japanese Patent Application No. 2008-125904, filed on May 13, 2008 in the Japan Patent Office, the disclosure of which is herein incorporated by reference in its entirety.

BACKGROUND OF THE INVENTION

1. Field of the Invention

This invention relates generally to apparatuses and methods for recording information in an optical storage medium, and specifically to an apparatus and a method for recording information in an optical storage medium using a pulsed laser.

2. Description of Related Art

Optical storage media, such as DVD-R and Blu-ray (registered trademark) discs, in which information is retrievably recordable, typically adopts the dual-layer recording scheme in order to increase the storage capacity. In recent years, to enable recording in more than two layers, a recording method using a two-photon absorption compound has become a focus of study.

The two-photon absorption compound is a compound which absorbs light with electrons excited therein only when two photons simultaneously strike the compound. Therefore, the two-photon absorption compound induces reaction (absorption) with a probability proportional to the square of the intensity of the input light and with high resolution and selectivity in depth of focus. To be more specific, when a laser beam is focused into the optical storage medium having a recording layer containing a two-photon absorption compound, the two-photon absorption compound absorbs (reacts with) the input beam only in a small region around a focused point and never reacts in regions even slightly out of the small region in depth (in the direction of travel of the laser beam). In this way, the two-photon absorption compound is capable of inducing reaction in a small region in depth, and thus a recording layer made of this compound is suitable for recording information in multiple layers.

It is desirable to use a pulsed laser such as a femtosecond laser instead of a hitherto prevalently used continuous-wave laser particularly when an optical storage medium containing a two-photon absorption compound is used to record information therein. This is because the pulsed laser can produce a laser beam having a peak power sufficient to induce two-photon absorption reaction even when it operates at a relatively low average power.

Since the conventional apparatus for recording information in an optical storage medium uses a continuous-wave laser, the timing control of the laser beam is not a matter of particular concern, and the operation timing of internal components of the apparatus are synchronized based upon a synchronizing signal which is generated for example by using a wobble signal (see JP 2005-122807 A).

However, in the apparatus where a pulsed laser is used, the timing of pulsing of a pulsed laser beam is difficult to control in some instances depending upon the type of the pulsed laser used. Therefore, disadvantageously, a synchronizing signal generated independently of the pulsed laser, as used in the conventional apparatus, could not be used to synchronize the internal components of the apparatus.

The present invention has been made against this backdrop.

SUMMARY OF THE INVENTION

It is one aspect of the present invention to provide an apparatus for recording information in an optical storage medium, in which its system clock for synchronizing the internal components of the apparatus is synchronized precisely with the timing of pulsing of the pulsed laser beam emitted from the pulsed laser, so that recording can be performed with good quality. To this end, a controller which comprises means for generating a synchronizing signal based upon the pulsed laser beam is provided. The controller is configured to exercise control in such a manner that an optical system or other component of the apparatus operates in synchronization with timing represented by the synchronizing signal.

More specifically, according to one embodiment of the present invention, there is provided an apparatus for recording information in an optical storage medium, comprising: a medium support part configured to support the optical storage medium; a laser light source configured to produce a pulsed laser beam; a beam splitter configured to split the pulsed laser beam generated by the laser light source into first and second pulsed laser beams; a beam-condensing optical system configured to concentrate the first pulsed laser beam in the optical storage medium supported by the medium support part; a shutter configured to interrupt and resume emission of the first pulsed laser beam; a photosensor configured to receive the second pulsed laser beam to produce a detection signal; and a controller. The controller comprises: a sync-generator configured to receive the detection signal from the photosensor and to generate a synchronizing signal based upon the received detection signal; and a shutter driver configured to drive the shutter in synchronization with timing represented by the synchronizing signal generated by the sync-generator.

With this apparatus, the photosensor receives a second pulsed laser beam split off from the pulsed laser beam produced by the laser light source, and produces a detection signal, based upon which a synchronizing signal is generated by the sync-generator. That is, the synchronizing signal is generated based upon the pulsed laser beam (in a manner synchronized with the timing of pulsing thereof) which is to be directed to the optical storage medium for recording information therein. Thus, the system clock for synchronizing the internal components of the apparatus is synchronized precisely with the timing of pulsing of the pulsed laser beam.

Furthermore, the shutter driver of the controller controls the operation timing of the shutter in synchronization with the timing represented by the synchronizing signal, so that the operation of the shutter is synchronized with the timing of pulsing of the pulsed laser beam. Accordingly, the operation of interrupting and resuming emission of the pulsed laser beam to cancel specific pulses can be performed with increased accuracy.

The above-described apparatus may, preferably but not necessarily, further comprise a motor that is configured to cause the medium support part to rotate, whereas the controller may further comprise a motor driver configured to drive the motor in such a manner that a rotation cycle of the motor is an integral multiple of a time interval represented by the synchronizing signal generated by the sync-generator.

With this additional feature, the rotation cycle of the motor can be synchronized precisely with the timing represented by the synchronizing signal, and thus the recording position in the storage medium can be adjusted precisely.

According to the aspects and specific embodiments of the present invention, which may be embodied in an apparatus or method for recording information in an optical storage medium, as will be described below, the recording can be performed with improved quality because an optical system or other component of the apparatus can be controlled to operate in synchronization with the timing of pulsing of the pulsed laser beam emitted from the laser light source.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which.

DETAILED DESCRIPTION OF THE EXEMPLARY EMBODIMENTS

A detailed description will be given of the exemplary embodiments of the present invention with reference to the drawings. In the following description, an optical disc drive for recording or retrieving data (information) in an optical disc is taken as an example of an apparatus for recording information in an optical storage medium according to one exemplary embodiment of the present invention.

Figure 1:
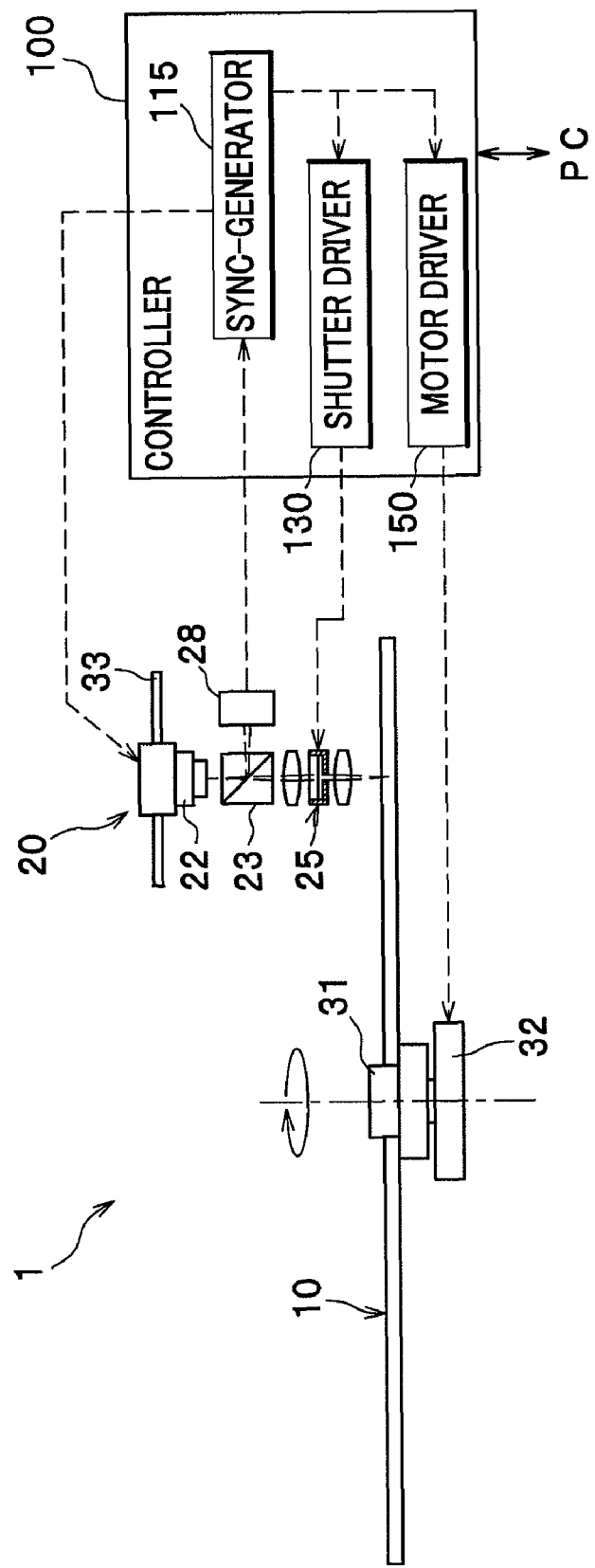
FIG. 1 is a schematic diagram showing an optical disc drive according to an exemplary embodiment of the present invention.

As shown in FIG. 1, an optical disc drive 1 is an apparatus for optically recording information (data) received from a computer (PC) or the like in an optical disc 10, and principally includes a spindle 31 as one example of a medium support part configured to support an optical disc 10, a motor 32 configured to rotate the spindle 31 (means for moving or rotating the medium support part on which the optical storage medium is supported), an optical pickup 20, a guide 33 configured to guide the movement of the optical pickup 20 along a path extending parallel to the direction of a radius of the optical disc 10, and a controller 100.

Figure 2:
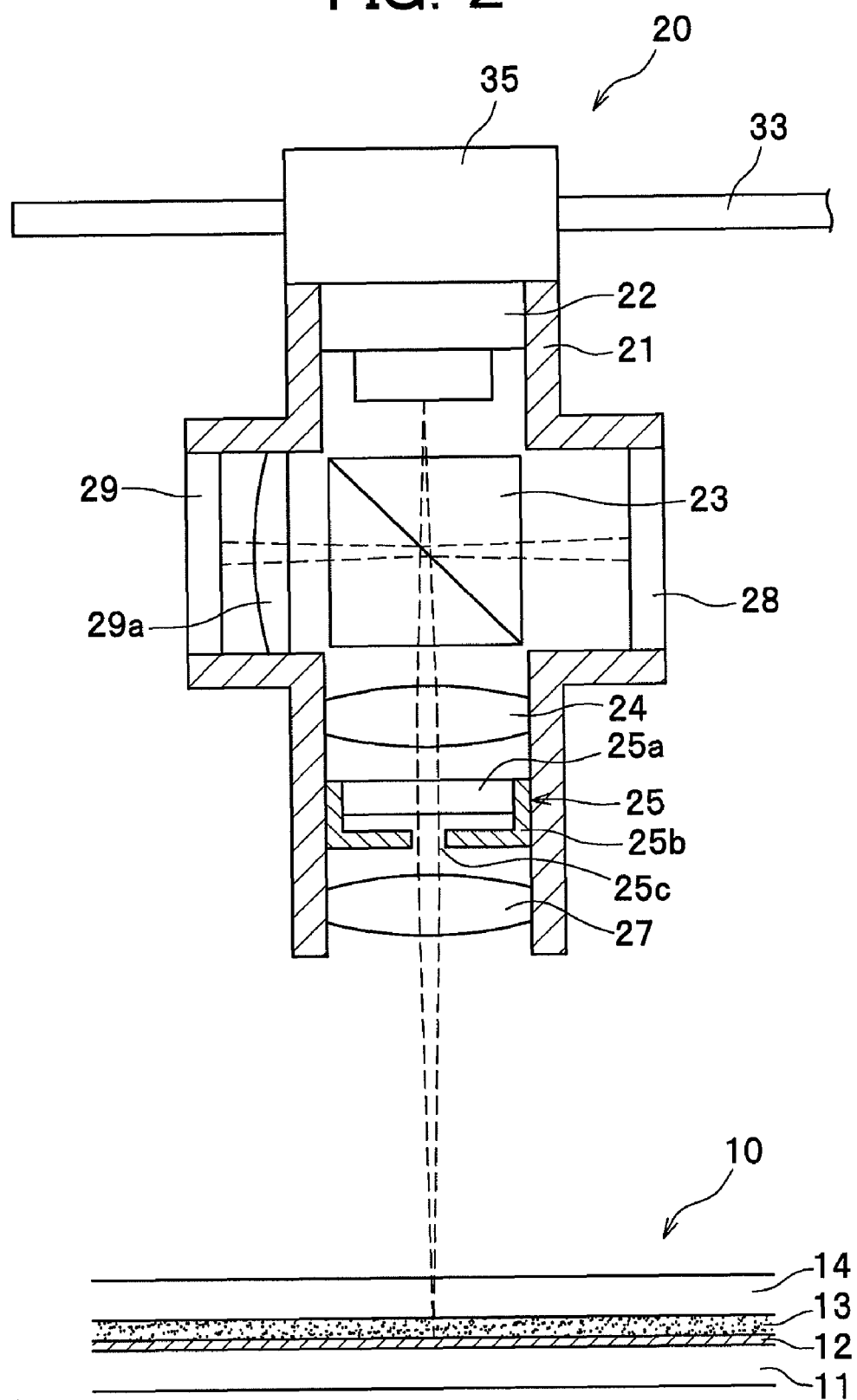
FIG. 2 is an enlarged sectional view of an optical pickup and an optical disc.

As shown in FIG. 2, the optical disc 10 as one example of an optical storage medium is of a laminated structure with a substrate 11 and some layers which include a reflecting layer 12, a recording layer 13 and a cover layer laminated on top of the substrate 11 in this order.

The substrate 11 is a board supporting the recording layer 13, and made of a plastic plate, a glass plate, a metal plate, a semiconductor plate, or the like.

The reflecting layer 12 is a layer which reflects a laser beam into the optical pickup 20 when recorded data is retrieved. The reflecting layer 12 is optional, and may thus be omitted if the optical pickup 20 is configured such that a laser beam emitted from a laser light source and transmitted by the optical disc 10 is received at a side opposite to the laser light source of the optical pickup 20.

The recording layer 13 is a layer which contains a two-photon absorption compound. The two-photon absorption compound is a compound which absorbs light by excitation of electrons only if two photons enter the compound simultaneously (to be more exact, within an extremely short period of time). In cases where the two-photon absorption compound is used for an optical storage medium, excitation energy of the electrons is utilized to induce a chemical reaction which changes the refraction index, absorptivity and the like of light (light for retrieval or decoding of information). The two-photon absorption compound usable for implementing the present invention may include diarylethenes, for example.

The cover layer 14 is a layer which protects the recording layer 13, and is made of any material which can transmit a laser beam emitted in the recording and retrieving operations. For example, the cover layer 14 may be made of resin or glass.

The optical disc 10 may be provided with one or more of other layers such as an antireflection coating.

On the other hand, the optical pickup 20 includes a barrel 21, and optical components housed in the barrel 21 which include a laser 22 as a laser light source, a beam splitter 23, a collimating lens 24, a shutter 25, an objective lens 27, a first photosensor 28, and a second photosensor 29.

The laser 22 is a pulsed laser which periodically emits a laser beam, and may preferably but not necessarily be a femtosecond laser light source which is capable of emitting a strong laser beam for an extremely short period of time in order to effectively induce a two-photon absorption reaction.

The beam splitter 23 is composed of a semitransparent mirror, and located downstream of the laser 22 along a path to be traveled by a pulsed laser beam emitted from the laser 22. The beam splitter 23 splits the pulsed laser beam emitted from the laser 22 into two beams one of which (second pulsed laser beam) is reflected therein to branch off toward the first photosensor 28, and splits a beam coming back from the optical disc 10 into two beams one of which is reflected therein to branch off toward the second photosensor 29.

The collimating lens 24 is a lens located downstream of the beam splitter 23 along the path to be travelled by a pulsed laser beam (first pulsed laser beam) emitted from the laser 22. The collimating lens 24 makes the pulsed laser beam into a parallel beam.

The shutter 25 is an element configured to interrupt and resume emission of the pulsed laser beam (first pulsed laser beam), and includes a deflection element 25a and a shutter plate 25b having an aperture 25c. The shutter 25 is located downstream of the collimating lens 24 along the path to be travelled by a pulsed laser beam (first pulsed laser beam) emitted from the laser 22. The shutter 25 may preferably but not necessarily be a non-mechanical optical switch for the purpose of high-speed operation. The deflection element 25a is composed of an electrooptical modulator (EOM) including an electrooptic material in which the indices of refraction are changed by an input signal. When the deflection element 25a does not receive a signal, the pulsed laser beam is allowed to pass through the aperture 25c. When the deflection element 25a receives a signal, the pulsed laser beam is deflected and interrupted by the shutter plate 25b.

The objective lens 27 is located downstream of the shutter 25 along the path to be travelled by a pulsed laser beam (first pulsed laser beam) emitted from the laser 22. The objective lens 27 serves to converge the pulsed laser beam so as to make the pulsed laser beam focused in the recording layer 13. The position of the objective lens 27 is moved by a focusing coil 41 (not shown in FIG. 2; see FIG. 3), thereby adjusting the focus of the objective lens 27 to properly focus the pulsed laser beam. The collimating lens 24 and the objective lens 27, in this embodiment, constitute a beam-condensing optical system configured to concentrate the first pulsed laser beam in the optical disc 10 supported by the spindle 31.

The first photosensor 28 is a transducer which receives a pulsed laser beam (second pulsed laser beam) branched off in the beam splitter 23 and converts the received pulsed laser beam into a signal (detection signal) to be sent to the controller 100.

The second photosensor 29 is a transducer which is disposed to receive a laser beam reflected from the optical disc 10 and branched off in the beam splitter 23, and a signal produced in the second photosensor 29 is also provided to the controller 100.

The optical pickup 20 as described above is configured to move along a guide 33, i.e., along a path extending parallel to the direction of a radius of the optical disc 10, by an actuator 35 known in the art as one example of means for causing the pulsed laser beam to scan a recordable region (recording layer) of the optical disc 10.

Figure 3:
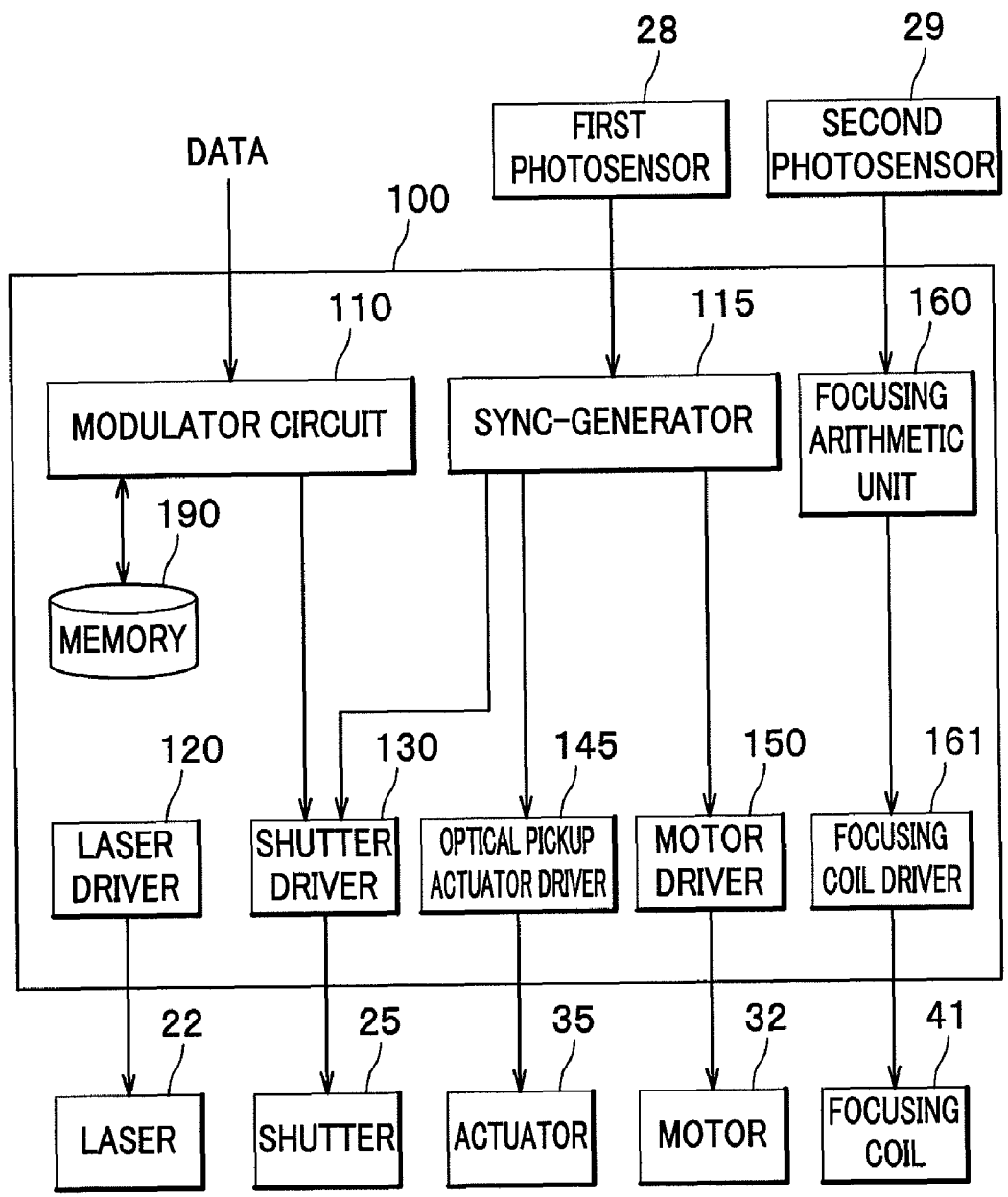
FIG. 3 is a block diagram of a controller of the optical disc drive.

As shown in FIG. 3, the controller 100 receives data to be recorded, and controls the laser 22, shutter 25, actuator 35, motor 32 and focusing coil 41, based upon the signals received from the first photosensor 28 and the second photosensor 29. The controller 100 includes a modulator circuit 110, a sync-generator 115, a laser driver 120, a shutter driver 130, an optical pickup actuator driver 145, a motor driver 150, a focusing arithmetic unit 160, a focusing coil driver 161, and a memory 190. Each unit of the controller 100 may be composed of a dedicated circuit, or implemented by execution of a program on a computer which includes a CPU, a ROM, a RAM and other components.

The modulator circuit 110 is a circuit which modulates data to be recorded, into digital data (pit array data) indicative of a linear array of pits. The modulator circuit 110 may be composed of an EFM (eight-to-fourteen modulation) modulator circuit known in the art.

The sync-generator 115 is a circuit configured to receive a detection signal indicative of intensity of light detected by the first photosensor 28 and to generate a synchronizing signal with the same timing (i.e., at the same frequency) as that of the received detection signal (intensity signal). This signal is used to synchronize the operations of the shutter driver 130, the optical pickup actuator driver 145 and the motor driver 150.

The sync-generator 115 may be realized through the use of a phase locked loop (PLL) circuit known in the art. The PLL circuit is a circuit which is configured to receive a signal having a reference frequency, and to generate an oscillation signal having a frequency which is N times the reference frequency. The PLL circuit consists essentially of a phase detector, a loop filter, a voltage-controlled oscillator (VCO), and a frequency divider.

The laser driver 120 is a known element which generates and sends to the laser 22 a driving signal for causing the laser 22 to emit a laser beam.

The shutter driver 130 is a device which drives the shutter 25 in accordance with the pit array data received from the modulator circuit 110. The shutter driver 130 is configured to convert the (first) pulsed laser beam having a definite period (fixed timing of pulsing) into a pulsed laser beam interrupted and resumed in a pattern corresponding to the pit array data, by selectively cancelling pulses of the first pulsed laser beam emitted from the pulsed laser 22. The pulsed laser beam resulting from cancellation of specific pulses may be constructed such that more than one pulse may form a single pit. The length of each pit may thus be varied by a factor of the unit length of the single pit corresponding to one pulse. For example, the shortest pit is formed with one pulse, while the longer pit is formed with two or more pits. The operation of the shutter driver 130 is controlled in such a manner that shutter 25 operates in synchronization with timing represented by a synchronizing signal received from the sync-generator 115.

The optical pickup actuator driver 145 is a device similar to that which is implemented in a known optical disc drive, and is configured to drive the actuator 35 at a predetermined speed in such a manner that a recording track is formed spirally in the optical disc 10. The optical pickup 20 is thus caused to gradually move radially from an inner edge outward or from an outer edge inward. The optical pickup actuator driver 145 receives a synchronizing signal from the sync-generator 115, and the speed of the radial movement of the optical pickup 20 actuated by the actuator 35 is regulated in accordance with the synchronizing signal.

The motor driver 150 is a known device which drives the motor 32 to rotate the optical disc 10. The motor driver 150 receives a synchronizing signal from the sync-generator 115, and the rotation speed of the optical disc 10 is regulated in accordance with the synchronizing signal. To be more specific, the rotation cycle of the motor 32 is adjusted in such a manner that a period of time of one rotation of the motor 32 is phased with an integral multiple of that represented by the synchronizing signal generated by the sync-generator 115. This configuration may be established, by way of example, with a stepping motor adopted as the motor 32 and a frequency divider configured to output a driving pulse signal having a frequency which is an integral submultiple of that of the synchronizing signal, so that the motor driver 150 applies the driving pulse signal to a control circuit of the motor 32.

The rotation speed of the motor 32 driven by the motor driver 150 may preferably be regulated such that pulses of the regularly pulsed laser beam striking the optical disc 10 will circumferentially overlap each other. With this configuration, the length of each pit can be adjusted by varying the number of pulses which will reach the optical disk 10 without interruption. In this way, several pits of varying length can be formed appropriately.

The focusing arithmetic unit 160 is a device which receives a signal indicative of receipt of light from the second photosensor 29 and calculates the amount of control over the objective lens 27 for focusing the beam. The focusing arithmetic unit 160 is configured to calculate the amount of control, for example, using a known astigmatic method or any other method. The result of calculation is outputted to the focusing coil driver 161.

The focusing coil driver 161 is a device which provides a driving signal to the focusing coil 41 in accordance with the amount of control calculated in the focusing arithmetic unit 160.

The memory 190 is a storage space capable of storing data for use in the controller 100 performing operations, such as modulation in the modulator circuit 110, where appropriate.

The operation of the optical disc drive 1 configured as described above will now be described in detail.

Data inputted to the controller 100 from a computer (PC) or the like is modulated by the modulator circuit 110 into pit array data.

The laser driver 120 drives the laser 22, and causes a pulsed laser beam to be emitted from the laser 22. Meanwhile, the motor driver 150 rotates the motor 32 at a predetermined rotation speed, so as to rotate the optical disc 10.

The controller 100 waits, before starting a recording operation, until the rotation speed (rotation cycle) of the motor 32 and the pulsed laser beam are synchronized. At this stage, the pulsed laser beam generated by the laser 22 is split by the beam splitter into the first and second pulsed laser beams, and the second pulsed laser beam reflected in the beam splitter 23 is received by the first photosensor 28. The first photosensor 28 produces a detection signal which is indicative of a voltage varying according to the amount of light received by the first photosensor 28 (see FIG. 4(*a*)), and provides the output detection signal to the controller 100. In the controller 100, the sync-generator 115 receives this detection signal, and generates an oscillation signal (synchronizing signal, see FIG. 4(*b*)) based upon the received detection signal, and provides the oscillation signal to the shutter driver 130, the optical pickup actuator driver 145, and the motor driver 150.

Figure 4:
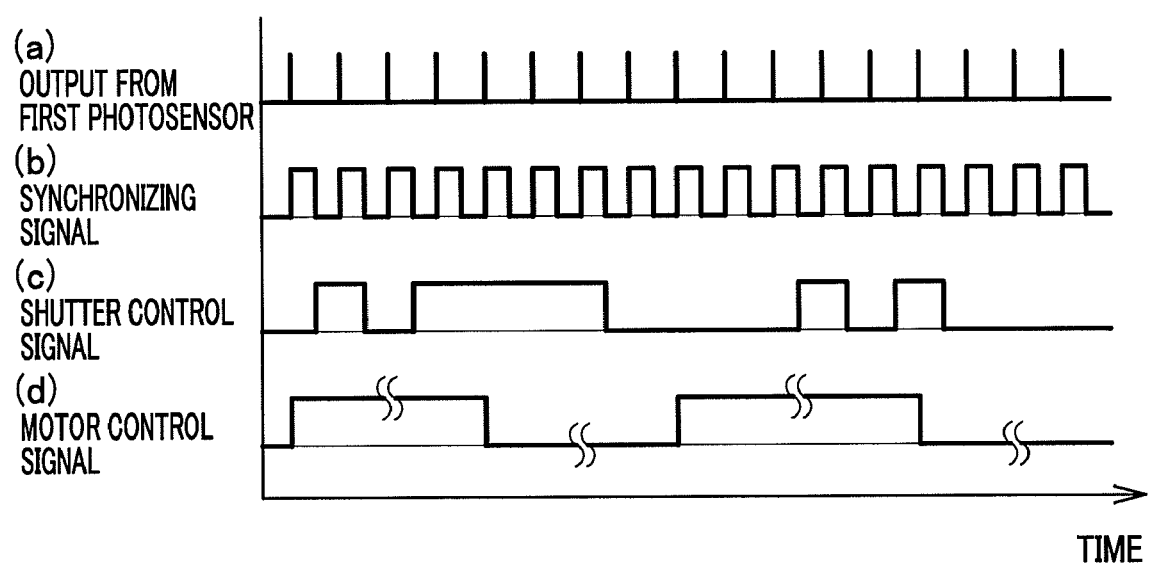
FIG. 4 is a diagram showing waveforms of: (a) a detection signal output from a first photosensor, (b) a synchronizing signal; (c) a shutter control signal; and (d) a motor control signal.

The motor driver 150 generates a motor control signal (driving pulse signal, see FIG. 4(*d*)) having a period or cycle which is an integral multiple of a time interval represented by the synchronizing signal, using a frequency divider (not shown) in which the frequency of the output signal is an integral submultiple of the input frequency of the synchronizing signal. The motor driver 150 thus provides the motor control signal to the control circuit of the motor 32, so that the rotation cycle of the motor is an integral multiple of the time interval represented by the synchronizing signal.

When the rotation speed of the motor 32 becomes stable, the optical pickup actuator driver 145 of the controller 100 causes the optical pickup 20 to move to a position in which a pulsed laser beam produced and directed to the optical disc 10 therein will strike a recordable region of the optical disc 10 (region in which information has not yet been recorded). Then, the pulsed laser beam reflected back from the optical disc 10 is received by the second photosensor 29, and the focusing arithmetic unit 160 works out the amount of control for focusing the beam based upon the detection signal received from the second photosensor 29. The focusing coil 41 driven by the focusing coil driver 161 based upon the amount of control calculated in the focusing arithmetic unit 160 causes the pulsed laser beam to be focused on a desired position within the recording layer 13 of the optical disc 10.

Next, the optical pickup actuator driver 145 of the controller 100 causes the optical pickup 20 to be moved by the actuator 35 to a region in which information is to be recorded. At this stage, the laser driver 120 is operated to cause the laser 22 to periodically emit a pulsed laser beam without interruption. Before the recording operation is started, the output of the laser is increased to provide a light quantity suitable for recording while the pulsed laser beam is interrupted by the shutter 25. The adjustment of this light quantity is performed during the recording operation by a feed back control system.

The shutter driver 130 drives the shutter 25 in accordance with the pit array data generated by the modulator circuit 110. The operation of the shutter 25 is such that emission of the regularly pulsed laser beam is interrupted to cancel specific pulses of the pulsed laser beam. Therefore, the times of interruption should coincide with the times at which the leading edges of the pulses come to the shutter 25. In the optical disc drive 1 according to the present embodiment, a synchronizing signal is generated based upon the detection signal produced by the first photosensor 28 based upon the pulsed laser beam (the received second pulsed laser beam), and the operation of the shutter 25 is synchronized with the timing represented by this synchronizing signal. Thus, the timing of interruption by the shutter 25 can be synchronized with the timing of pulsing of the pulsed laser beam. For example, the shutter driver 130 generates and provides a shutter control signal to the shutter 25 to drive the shutter 25 in such a manner that the shutter 25 opens and closes at the leading or trailing edges of the pulses.

In this way, the pulsed laser beam directed to the recording layer 13 of the optical disc 10 is concentrated in an information recordable layer therein so as to form pits arranged in accordance with the pit array data, and the two-photon absorption reaction takes place selectively in the regions in which the laser beam is concentrated, which results in change of absorptivity of light. That is, the regions or pits of varying absorptivity of light are formed in the recording layer 13.

In the above method for recording information in the optical disc 10, the rotation cycle of the motor 32 is synchronized with an integral multiple of a time interval represented by the synchronizing signal, and thus the positions in which pits are to be formed can be adjusted precisely.

According to the above-described embodiment of the present invention, as implemented in the optical disc drive 1, the recording can be performed with improved quality because the system clock of the apparatus can be precisely synchronized with the timing of pulsing of the pulsed laser beam emitted from the laser 22. In particular, the operation of the shutter 25 can be synchronized with the timing of pulsing of the pulsed laser beam emitted from the laser 22 so that the pits can be formed accurately in accordance with the pit array data, and the rotation cycle of the motor 32 can also be synchronized with the timing of pulsing of the pulsed laser beam emitted from the laser 22 so that the positions in which pits are to be formed can be adjusted precisely.

Although the exemplary embodiment of the present invention has been described above, the present invention is not limited to this embodiment, and may be carried out into practice in various other ways. Thus, it is contemplated that various modifications and changes may be made to the exemplary embodiment of the invention without departing from the scope of the embodiment of the present invention as defined in the appended claims.

For example, in describing the embodiment of the present invention, an optical disc 10 is adopted as one example of the optical storage medium. However, the optical storage medium applicable is not necessarily shaped like a disc; rather, rectangular or card-type optical storage medium may be preferable in some instances.

Furthermore, in the above-described embodiment, in order to cause the pulsed laser beam to scan a recordable region of the optical disc 10 entirely, an actuator 35 configured to move the optical pickup 20 along a path parallel to the direction of a radius of the optical disc 10 is employed by way of example; however, the present invention is not limited to this specific embodiment. Any means for relatively moving the laser beam and optical storage medium may be applicable as long as the entire recordable regions can be scanned with the laser beam. For example, the pulsed laser beam may be deflected so as to scan the recordable region of the optical recording medium.

What is claimed is:

1. An apparatus for recording information in an optical storage medium, comprising:
   a medium support part configured to support the optical storage medium;
   a laser light source configured to produce a pulsed laser beam;
   a beam splitter configured to split the pulsed laser beam generated by the laser light source into first and second pulsed laser beams;
   a beam-condensing optical system configured to concentrate the first pulsed laser beam in the optical storage medium supported by the medium support part;
   a shutter configured to interrupt and resume emission of the first pulsed laser beam;
   a photosensor configured to receive the second pulsed laser beam to produce a detection signal; and
   a controller which comprises:

a sync-generator configured to receive the detection signal from the photosensor and to generate a synchronizing signal based upon the received detection signal; and a shutter driver configured to drive the shutter in synchronization with timing represented by the synchronizing signal generated by the sync-generator.

2. The apparatus according to claim 1, further comprising a motor that is configured to cause the medium support part to rotate, wherein the controller further comprises a motor driver configured to drive the motor in such a manner that a rotation cycle of the motor is an integral multiple of a time interval represented by the synchronizing signal generated by the sync-generator.

3. The apparatus according to claim 1, wherein the optical storage medium comprises a recording layer containing a two-photon absorption compound.

4. The apparatus according to claim 1, wherein the laser light source comprises a femtosecond laser.

5. An apparatus for recording information in an optical storage medium, comprising:

an optical system which comprises:
means for producing a pulsed laser beam to be directed to the optical storage medium supported on a medium support part;
means for causing the pulsed laser beam to scan a recordable region of the optical storage medium; and
means for interrupting and resuming emission of the pulsed laser beam in accordance with pit array data indicative of the information to be recorded, and a controller which comprises means for generating a synchronizing signal based upon the pulsed laser beam, and means for controlling the means for interrupting and resuming emission of the pulsed laser beam in such a manner that the means for interrupting and resuming emission of the pulsed laser beam operates in synchronization with timing represented by the synchronizing signal.

6. The apparatus according to claim 5, wherein the means for causing the pulsed laser beam to scan a recordable region of the optical storage medium comprises means for moving the medium support part on which the optical storage medium is supported, and wherein the controller further comprises means for controlling the means for moving the medium support part in such a manner that the means for moving the medium support part operates in synchronization with timing represented by the synchronizing signal.

7. The apparatus according to claim 5, wherein the means for causing the pulsed laser beam to scan a recordable region of the optical storage medium comprises means for rotating the medium support part on which the optical storage medium is supported, and wherein the controller further comprises a frequency divider configured to output a driving pulse signal having a frequency which is an integral submultiple of that of the synchronizing signal, and means for controlling the means for rotating the medium support part in such a manner that the means for rotating the medium support part operates in synchronization with timing represented by the driving pulse signal.

8. The apparatus according to claim 5, wherein the means for causing the pulsed laser beam to scan a recordable region of the optical storage medium comprises means for deflecting the pulsed laser beam, and wherein the controller further comprises means for controlling the means for deflecting the pulsed laser beam in such a manner that the means for deflecting the pulsed laser beam operates in synchronization with timing represented by the synchronizing signal.

9. The apparatus according to claim 5, wherein the means for causing the pulsed laser beam to scan a recordable region of the optical storage medium comprises means for moving the optical system relative to the medium support part on which the optical storage medium is supported, and wherein the controller further comprises means for controlling the means for moving the optical system in such a manner that the means for moving the optical system operates in synchronization with timing represented by the synchronizing signal.

10. A method for recording information in an optical storage medium, comprising the steps of:

(a) providing an optical system which comprises:
means for producing a pulsed laser beam to be directed to the optical storage medium supported on a medium support part;
means for causing the pulsed laser beam to scan a recordable region of the optical storage medium; and
means for interrupting and resuming emission of the pulsed laser beam in accordance with pit array data indicative of the information to be recorded;

(b) generating a synchronizing signal based upon the pulsed laser beam; and (c) controlling the optical system in such a manner that the optical system operates in synchronization with timing represented by the synchronizing signal,
wherein the step (c) comprises causing the means for interrupting and resuming emission of the pulsed laser beam to operate in synchronization with timing represented by the synchronizing signal.

11. The method according to claim 10, wherein the step (c) further comprises causing the medium support part on which the optical storage medium is supported to move in a manner synchronized with timing represented by the synchronizing signal.

12. The method according to claim 10, wherein the step (c) further comprises causing the medium support part on which the optical storage medium is supported to rotate in a manner synchronized with timing represented by a driving pulse signal having a frequency which is an integral submultiple of that of the synchronizing signal.

13. The method according to claim 10, wherein the step (c) further comprises causing the pulsed laser beam to be deflected in a manner synchronized with timing represented by the synchronizing signal.

14. The method according to claim 10, wherein the step (c) further comprises causing the optical system to move relative to the medium support part on which the optical storage medium is supported in a manner synchronized with timing represented by the synchronizing signal.

* * * * *